Nov. 1, 1955  R. F. SMITH  2,722,264
GOLF BALL COVER BLANK CONSTRUCTION
Filed June 11, 1953

INVENTOR.
Robert F. Smith
BY
Frease & Bishop
ATTORNEYS

2,722,264

GOLF BALL COVER BLANK CONSTRUCTION

Robert F. Smith, Elyria, Ohio, assignor to The Worthington Ball Company, Elyria, Ohio, a corporation of Ohio Application June 11, 1953, Serial No. 360,972

4 Claims. (Cl. 154—17)

The invention relates generally to golf balls and more particularly to a precision molded cover blank for manufacturing golf balls formed of polyethylene plastic material.

In the prior manufacture of golf balls, the covers ordinarily have been formed of balata, or gutta percha. In such prior manufacture a slug of desired weight is cut from a body or bar of balata or gutta percha and heated in hot water to prevent oxidation, after which the thus heated slug is formed in a cold compression molding press generally to semi-spherical cup shape and preferably with an enlarged button in the outer central bottom wall surface of the cup shape. Such generally semi-spherical blanks ordinarily have a thinner wall thickness in the side walls thereof adjacent the open end of the cup than in the bottom wall thereof and a substantial flash is produced in the upper open end of the cup during the press forming of the hot water heated slug.

Although some attempts have been made to maintain accurate concentricity of balata or gutta percha cover blanks formed in the manner described, nevertheless there are substantial variations in the shapes thereof from piece to piece and likewise there are some variations in the thickness of the blank at any section taken on a plane normal to an axis through the center of the cup. In other words, eccentricity in the wall thickness of the cover blank occurs. Such eccentricity may result in a final, though small, eccentricity of cover thickness in a golf ball made by inserting a wound golf ball core in two such semi-spherical blanks and placing the same in a die to mold the cover blanks and form the completed golf ball.

Furthermore, the surfaces of such balata or gutta percha cover blanks are not smooth, uniform or even. Surface porosity or recesses or unevenness are always present both in the interior and exterior surfaces of cover blanks so formed which prevent the maintenance of absolutely uniform molding conditions in the subsequent molding of a golf ball using such cover blanks. Such surface porosity probably occurs from small droplets of the water in which the slug is heated adhering to the surface of the slug, which water droplets are trapped in the mold during the cold compression forming of the blanks causing the surface indentations.

Such surface porosity on balata or gutta percha golf ball cover blanks may be minimized by air heating the slug prior to molding rather than by heating in hot water; but air heating may cause oxidation having a detrimental effect upon the resultant ball.

I have discovered that these and other difficulties in the manufacture of golf balls can be avoided or eliminated by forming golf ball covers of blanks formed of polyethylene plastic material. Such material has physical properties closely approaching those of balata or gutta percha in respect to resiliency and toughness. Thus polyethylene plastic material has a tensile strength of 1800 pounds with 550% elongation. However, it will not oxidize under normal conditions, or varying conditions of weather and sunlight, and it retains its predetermined physical characteristics indefinitely and remains unchanged with age.

Normally, it is not affected by chemicals, such as may be applied to turf on golf links and it is unaffected by humidity changes, or fresh or salt water, and it does not harden or crack but retains its resiliency and toughness for a long period of time.

Moreover, such material may have color such as white coloring material incorporated therein and throughout, while retaining a specific gravity of a level, that is 0.94 at 20° C., which is desirable from other standpoints in forming a golf ball cover therefrom.

Furthermore, I have discovered that polyethylene plastic material may be formed into extremely accurate shaped and sized thin-walled cup-shaped blanks with absolutely uniform wall thickness at any section taken on a plane lying normal to the axis of the cup-shaped or semi-spherical blank; and such material also can be molded to have extremely smooth and uniform interior and exterior surfaces, free of the surface porosity or indentations which are characteristic of the described prior art balata or gutta percha golf ball cover blanks.

I further have discovered that when a cup-shaped golf ball cover blank is formed of polyethylene plastic with the uniformity described as to wall thickness and surface finish, golf balls may be molded from such cover blanks without eccentricity of weight distribution in the outer regions of the ball so that each ball is perfectly balanced and any number of balls constructed in the same manner are uniform and identical from ball to ball. This enables a player to attain and maintain greater control and accuracy throughout a game where it is necessary to use a series of balls during the course of a game.

The use of polyethylene plastic as a cover material for a golf ball also enables painting of the ball to be eliminated because the necessary white coloring material can be added to the plastic. It has always been necessary to paint golf balls having a balata or gutta percha cover with two or three coats of paint. In painting, it is impossible to obtain absolute uniformity in paint thickness over the entire outer surface of a golf ball including the dimple depression; and variations in paint thickness, particularly in the dimples where variations always occur, can result in weight eccentricity in an otherwise perfectly balanced ball, which reduces the accuracy of the ball in flight and in putting.

Also, the elimination of paint from the surface of a golf ball enables uniformity in dimple shape with sharp corners to be maintained, so that the dimples retain their uniform wind resistance thereby keeping the ball from skidding or dipping in flight.

When a golf ball is painted, in addition to the non-uniformity of paint thickness, particularly in the dimples, the intersection of the dimple surfaces with the outer spherical ball surface is not sharp but rounded, which reduces the uniformity of wind resistance of the ball in flight.

Accordingly, it is an object of the present invention to provide a new semi-spherical polyethylene plastic golf ball cover blank from which perfectly balanced golf balls may be manufactured.

Also, it is an object of the present invention to provide a new polyethylene plastic golf ball cover blank free of eccentricity having absolutely uniform wall thickness at any section taken on a plane normal to the axis of the cup-shaped blank; and having a wall thickness varying in a predetermined degree from the free edge of the cup-shaped blank to the bottom thereof, so that the blank contour at any section taken in a plane passing through the axis of the cup-shape will be the same as the contour at any section taken in any other similar plane.

Moreover, it is an object of the present invention to provide a new polyethylene plastic, cup-shaped, generally semi-spherical cover blank for the manufacture of golf balls having extremely smooth external and internal surfaces, free of surface porosity or indentations, thereby eliminating the possibility of cover thickness eccentricity in a golf ball molded from a wound core and two similar such cup-shaped blanks.

Also, it is an object of the present invention to provide a new white colored golf ball cover blank for the manufacture of golf balls whereby cover painting is eliminated, thereby eliminating the possibility of weight eccentricity in the outer regions of the ball.

In addition, it is an object of the present invention to provide a new precision molded golf ball cover blank from which a golf ball may be precision molded with precision formed dimples and spherical outer surfaces with sharp intersecting corners to maintain in the finished ball uniformity in dimple wind resistance in flight.

Moreover, it is an object of the present invention to provide a new precision formed polyethylene plastic golf ball cover blank from which golf balls may be manufactured and extreme accuracy in size, weight, surface and concentricity of the ball obtained, giving the highest degree of uniformity in flight characteristics, controllability and performance for any individual ball or for all balls in a group intended to be similar or the same.

Finally, it is an object of the present invention to provide a new golf ball cover blank construction incorporating the foregoing desiderata, which solves problems and avoids difficulties that have existed in the art, and which attains the foregoing advantages and results in an effective, simple and inexpensive manner.

These and other objects and advantages apparent to those skilled in the art from the following description and claims may be obtained, the stated results achieved and the described difficulties overcome, by the improvements, parts, elements, arrangements and constructions, which comprise the present invention, the nature of which is set forth in the following general statement, a preferred embodiment of which—illustrative of the best mode in which applicant has contemplated applying the principle—is set forth in the following description and drawing, and which are particularly and distinctly pointed out and set forth in the appended claims forming part hereof.

The nature of the discoveries and improvements in golf ball cover blank construction may be stated in general terms as including a cup-shaped blank formed of polyethylene plastic generally semi-spherical in shape, having a preferably spherical outer surface provided with a projecting dimple or button centrally of its bottom wall, and having a curved inner surface such that the side and bottom walls have increasing thickness from the open cup edge thereof to the bottom wall, with a greater rate of change of thickness as the side walls merge spherically into the bottom wall.

By way of example, a preferred embodiment of the improved golf ball cover blank construction is illustrated in the accompanying drawing forming part hereof wherein.

Similar numerals refer to similar parts throughout the various figures of the drawing.

Figure 1:
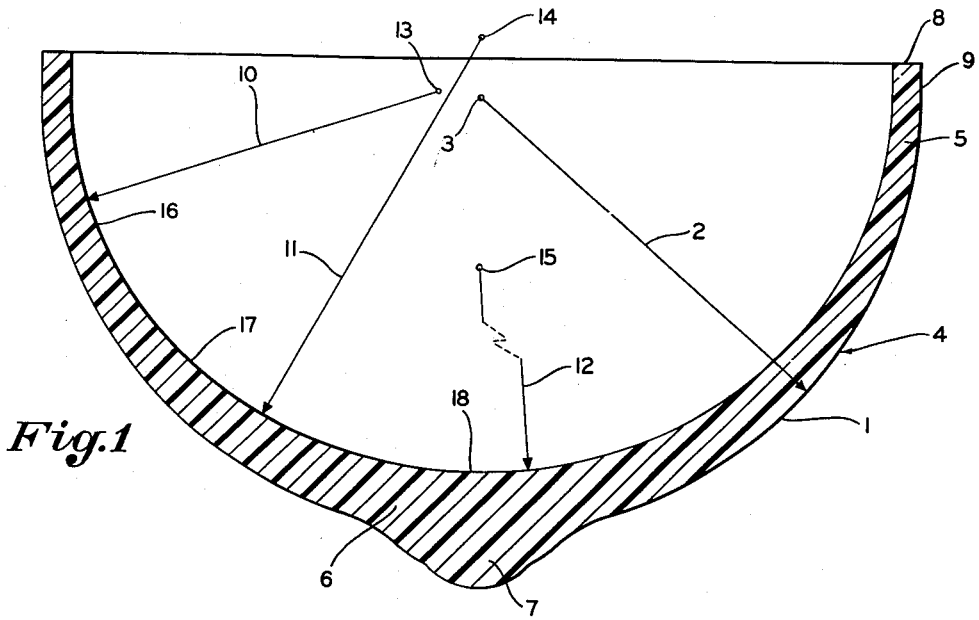
Fig. 1 is a greatly enlarged axial cross section through the improved cover blank.

The improved cover blank of the present invention is indicated generally at 4 in Fig. 1, and is generally semi-spherical in shape and has a spherical outer surface portion 1 formed on a radius 2 about a center 3. The cover blank 4 may also be defined as having a cup-shape with side wall portions 5 and a bottom wall portion 6. As the outer spherical surface portion 1 approaches the bottom wall portion 6 of the cup-shape, its contour is changed to form the rounded or projecting dimple or nipple portion 7.

Similarly, as the spherical outer surface portion 1 approaches the upper open edge 8 of the cup-shape, it merges with a generally cylindrical surface portion 9, as shown, or the surface portion 9 may flare slightly outward tangentially to the spherical surface 1.

The inner surface of the cup-shape blank 4 is preferably formed on a plurality of radii such as indicated at 10, 11 and 12. The radii 10, 11 and 12 preferably extend from centers indicated respectively at 13, 14 and 15 so that the contour of the inner surface of the cover blank 4 formed by arcuate portions blending into one another is such that the side wall thickness of the cup shape increases slightly from the open end toward the bottom wall in the region indicated at 16, formed by radius 10, increases in thickness at a greater rate in the region indicated at 17 formed by the radius 11, and becomes substantially thicker in the portion 18 of the bottom wall 6 formed by the radius 12.

When the cover blank is formed, shaped, contoured and configured in the manner shown and described, a substantial amount of cover material is located in the bottom wall portion 6 and projecting nipple portion 7 for a purpose to be described. Normally the outer diameter of the upper open end 8 of the cover blank 4 approximates the outer diameter of the outer spherical surface of the golf ball to be formed, which, under established official golf rules, must not be less than 1.68 inches.

I have discovered that a cover blank may be securately molded to the shape illustrated and described, to have absolutely uniform wall thickness at any section taken on a plane normal to the axis of the cup-shape, and to have a wall thickness varying in the predetermined degree described from the free edge of the cup-shape to the bottom wall thereof, so that the contour at any section taken as on the plane of the drawing will be the same as the contour taken on any other section on a plane passing through the axis of the cup-shape, by molding the blank from polyethylene plastic material.

Polyethylene plastic material is usually supplied in crystal form and may be mixed and ground with suitable white coloring material and with compounding materials where used, in the desired proportions and placed in the cylinder of injection molding equipment and heated to 475° F. to 550° F. until liquid. It may then be injected into the cavities of a multiple cavity die at a pressure of some 10,000 pounds per square inch, with the mold walls maintained at a temperature from 60° F. to 100° F.

Figure 2:
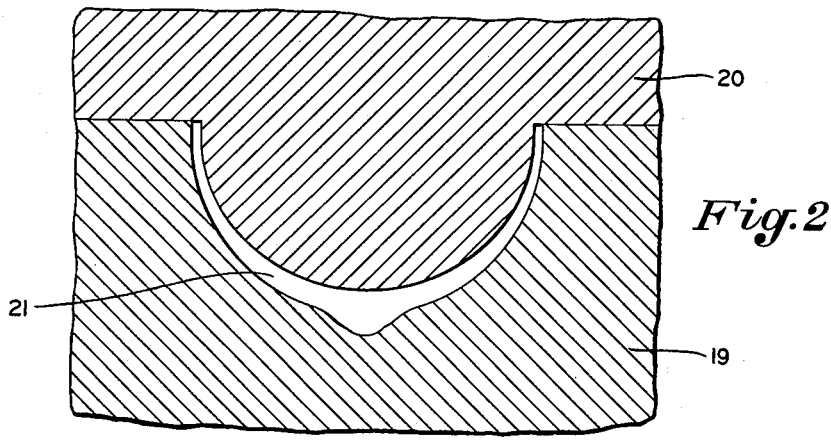
Fig. 2 is a fragmentary cross section through one cavity of a mold in which an improved cover blank may be precision molded; and, Fig. 3 is a perspective view of the improved precision molded golf ball cover blank.
Figure 3:
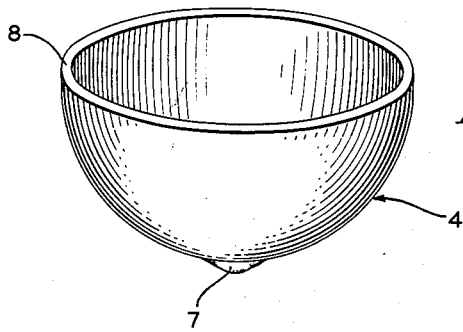

In Fig. 2, one cavity of such a multiple cavity mold is shown diagrammatically, the lower or female die being indicated at 19 and the upper or male die being indicated at 20. The low mold cavity temperature as compared with the temperature of the liquid polyethylene injected thereinto under high pressure is such that the plastic material sets immediately in the matter of a few seconds upon being injected into the cavity 21 formed between the male and female dies 20 and 19. The dies cool the cover blank 4 formed in the cavity 21 so that the blank 4 can be removed from the mold cavity on separation of the dies 19 and 20.

The mold cavity surfaces of course are formed with great precision and smoothness and the cover blank 4 molded in the cavity 21 under high pressure has extreme uniformity in wall thickness and concentricity so that all cover blanks formed are identical, piece by piece.

Furthermore, the surfaces, both external and internal of the cover blank 4 so molded of polyethylene plastic material are extremely smooth and uniform and provide uniform characteristics for the subsequent molding of such cover blanks around a wound golf ball core for making a golf ball.

In the subsequent forming of a golf ball from precision-molded, polyethylene plastic, generally semi-spherical, cover blanks 4, a rubber thread wound golf ball core with either a solid or liquid center is enclosed by two cover blanks 4 and is molded under pressure and at the temperature required in precision dies to form the completed ball and to bond the semi-spherical cover blanks together and to the threads of the wound core. During such ball molding operation, the additional material in the bottom wall 6 of the cover blank 4 is forced outward around the core to fill out the golf ball die cavity and dimple formations therein to form a truly spherical precision formed golf ball.

In the foregoing description, reference is made to polyethylene plastic material from which golf ball cover blanks have been successfully made in the manner described. Such polyethylene plastic material is sometimes referred to as polyethylene resin; and polyethylenes are otherwise referred to as ethylene polymers. Polyethylene is defined in 'Rubber Redbook," published by Rubber Age, as a generic name applied to a series of polymers of ethylene of various average molecular weights featuring low electrical losses together with high resistance to moisture and chemicals and toughness over a wide range of temperatures.

Golf ball cover blanks also have been made successfully in accordane with the present invention from nylon, which is a plastic; and from vinylite plastics which may be otherwise described as copolymerized vinyl chloride and vinyl acetate. "Rubber Redbook" defines vinylite plastics as a series of thermoplastic copolymers which may be compounded to form rigid or elastomeric materials for extrusion, calendering, or molding.

Also, golf ball cover blanks have been precision-molded successfully in accordance with the present invention of polyethylene plastic material with which other materials have been compounded. For example, golf ball cover blanks have been made of polyethylene resin with which 10% to 16%, by weight, of high styrene butadiene resin has been compounded. In other examples, 5% to 10% synthetic butyl rubber, by weight, has been compounded with polyethylene resin to form precision golf ball cover blanks in accordance with the present invention.

As another example, 10% gutta percha and 5% zinc oxide, by weight, have been compounnded with polyethylene resin to form golf ball cover blanks in accordane with the present invention.

As another example, 10% high styrene butadiene resin, 10% synthetic butyl rubber and 5% zinc oxide, by weight, have been compounded with polyethylene to make golf ball cover blanks in accordance with the present invention.

The golf ball cover blanks made in accordane with all of the examples described herein of polyethylene, or of nylon, or of vinylite plastics, or of polyethylene combined with high styrene butadiene resin, or synthetic butyl rubber, or gutta percha, either alone or in the combinations indicated, have approximately the same characteristics as to denseness, toughness, strength, smoothness, and ability to be formed accurately to precision shape.

When the term "polyethylene plastic" is used herein and in the claims, such term is intended to include polyethylene resin, nylon, vinylite plastics, and polyethylene with one or more of high styrene butadiene resin, synthetic butyl rubber and gutta percha compounded therewith.

Accordingly the present invention provides a new golf ball cover blank construction which may be formed of plastic material to a degree of accuracy impossible of attainment under present practice with gutta percha or balata, and which may be used in the manufacture of accurately shaped and configured golf balls incorporating the described characteristics and avoiding the difficulties and problems heretofore encountered in the manufacture of golf balls from blanks formed of balata or gutta percha.

In the foregoing description certain terms have been used for brevity, clearness and understanding, but no unnecessary limitations are to be implied therefrom beyond the requirements of the prior art, because such terms are used for descriptive purposes herein and not for the purpose of limitation, and are intended to be broadly construed.

Having now described the features, discoveries and principles of the invention; the manufacture of a preferred embodiment thereof, and the advantageous, new and useful results obtained thereby; the new and useful improvements, elements, parts, arrangements and constructions and reasonable mechanical equivalents thereof obvious to those skilled in the art, are set forth in the appended claims.

I claim:

1. A golf ball cover blank formed of polyethylene plastic material having a generally semi-spherical cup-shape, having a spherical outer surface provided centrally of its bottom wall with a projecting dimple, and having a curved inner surface so related to the spherical outer surface that the side and bottom walls have increasing thickness from the open cup edge to the bottom wall with a greater rate of change of thickness as the side walls merge spherically into the bottom wall.

2. A golf ball cover blank formed of polyethylene plastic material having a generally semi-spherical cup-shape, having a spherical outer surface provided centrally of its bottom wall with a projecting dimple, and having a curved inner surface contoured on a series of merging arcs formed on radii increasing in length from the open top edge to the bottom wall.

3. The golf ball cover blank construction as set forth in claim 2 in which the polyethylene plastic material comprises material selected from the group consisting of polyethylene plastic, nylon and vinylite plastic.

4. The golf ball cover blank construction as set forth in claim 2 in which the polyethylene plastic material has compounded therewith other material selected from the group consisting of high styrene butadiene resin, synthetic butyl rubber and gutta percha.

References Cited in the file of this patent

UNITED STATES PATENTS 2,624,916    Persak _____ Jan. 13, 1953

FOREIGN PATENTS 494,031    Great Britain _____ Oct. 19, 1938